United States Patent [19]
Moore

[11] Patent Number: 5,210,519
[45] Date of Patent: May 11, 1993

[54] DIGITAL DATA TRANSMISSION
[75] Inventor: Colin Moore, Warton, Great Britain
[73] Assignee: British Aerospace Public Limited Company, London, England
[21] Appl. No.: 702,392
[22] Filed: May 20, 1991
[30] Foreign Application Priority Data
  Jun. 22, 1990 [GB] United Kingdom ............... 9014003
[51] Int. Cl.$^5$ .............................................. H04B 3/54
[52] U.S. Cl. .......................... 340/310 R; 340/310 A; 340/310 CP; 375/36; 375/37
[58] Field of Search ........ 340/310 R, 310 A, 310 CP; 375/36, 37

[56] References Cited
U.S. PATENT DOCUMENTS

| | | | |
|---|---|---|---|
| 4,188,619 | 2/1980 | Perkins | 340/310 R |
| 4,342,013 | 7/1982 | Kallman | 333/181 |
| 4,481,501 | 11/1984 | Perkins | 340/310 R |
| 4,862,157 | 8/1989 | Noel | 340/310 R |
| 5,077,543 | 12/1991 | Carlile | 333/181 |

Primary Examiner—Jin F. Ng
Assistant Examiner—Edward Lefkowitz
Attorney, Agent, or Firm—Nixon & Vanderhye

[57] ABSTRACT

A method and apparatus for transmitting data over a power line (2) and having particular application for flight control networks. The method enables bi-directional transmission of data over either DC or AC power lines. Transformers ($T_3$, $T_4$) used for coupling data onto and from the power lines (2) comprise three windings ($L_1$, $L_2$ and $L_3$) and a ferrite core. Saturation of the core is avoided by arranging for the load current to flow in opposite senses through two ($L_1$ and $L_2$) of the windings. By choosing the number of turns of the two windings to be equal, complete cancellation of DC flux inside the core is possible.

6 Claims, 2 Drawing Sheets

DIGITAL DATA TRANSMISSION

BACKGROUND OF THE INVENTION

1. Field of the Invention

This invention relates to data transmission and in particular to a method and apparatus for transmitting digitally-coded data over power supply lines.

This manner of data transmission is especially useful for flight control networks in aircraft. The conventional use of triplex or quadruplex systems for flight control necessitates a large number of wires running from flight control computers to the various associated actuators. Combining the power bus and data bus together cuts down the amount of necessary wiring, thus reducing the weight and bulk of the network.

An object of the present invention is to provide a method and apparatus for enabling bi-directional data communication on a power supply line, which supply line may be AC or DC.

2. Description of the Prior Art

One known technique for achieving communication of data in this way (and shown in FIG. 1) uses a transformer $T_1$ for coupling data from a transmitter 1 onto a power line 2. Data is extracted by a second transformer $T_2$ and receiver 3 further down the power line. This arrangement functions satisfactorily if the supply current is steady. If, however, there is a surge, then the cores of the transformers could be driven into saturation. When this occurs, the transformers are no longer capable of transmitting or receiving the data signal. To increase the transformers' resistance to saturation, it is possible to incorporate an air gap between the core and transformer windings However this measure results in large and heavy devices which, in the aircraft control network application, is a disadvantage.

BRIEF SUMMARY OF THE INVENTION

The present invention aims to provide a solution to the saturation problem without incurring a weight penalty.

The invention therefore comprises a method and apparatus for transferring digital data to and from a power line by inductive coupling characterised in that a DC magnetic field generated by a current flowing in the power line and through a first inductance is opposed by a DC magnetic field generated by said current flowing in a second inductance.

For convenience, the two inductances may be wound on a common former. Bifilar windings could be used. The former could be provided with a ferrite core.

Preferably the number of turns on each of the two inductances are made substantially equal so that when current flows down the power line and through each inductance, the net magnetic flux inside the former is zero. Hence no saturation of the core can occur.

The power line may carry DC or AC power.

In the case of an AC supply, then the data rate must be chosen to be greater than the power supply frequency.

To prevent saturation of the transformer core by the data, it is preferred that a volts x seconds balance type code is used. An example of such a code is the Manchester code which always returns to zero after each clock cycle. This has a mean voltage value of zero.

BRIEF DESCRIPTION OF THE DRAWINGS

Some embodiments of the invention will now be described by way of example only with reference to the drawings of which.

DETAILED DESCRIPTION OF THE PREFERRED EMBODIMENTS

Figure 1:
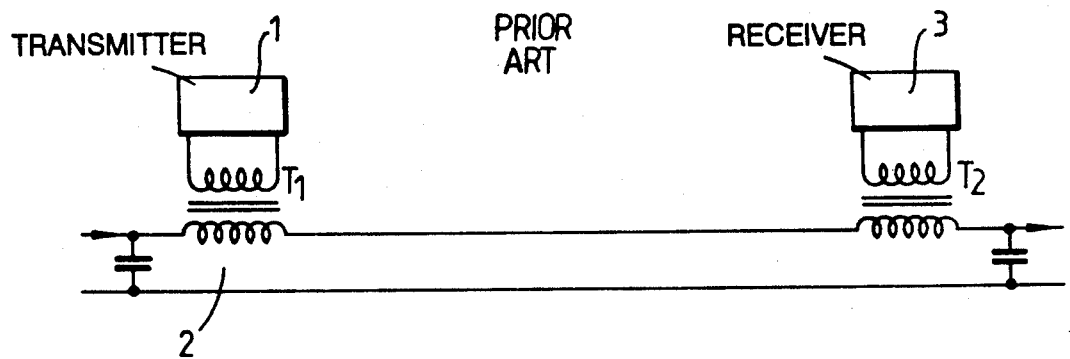
FIG. 1 is a circuit diagram of a prior art data transmission system.
Figure 2:
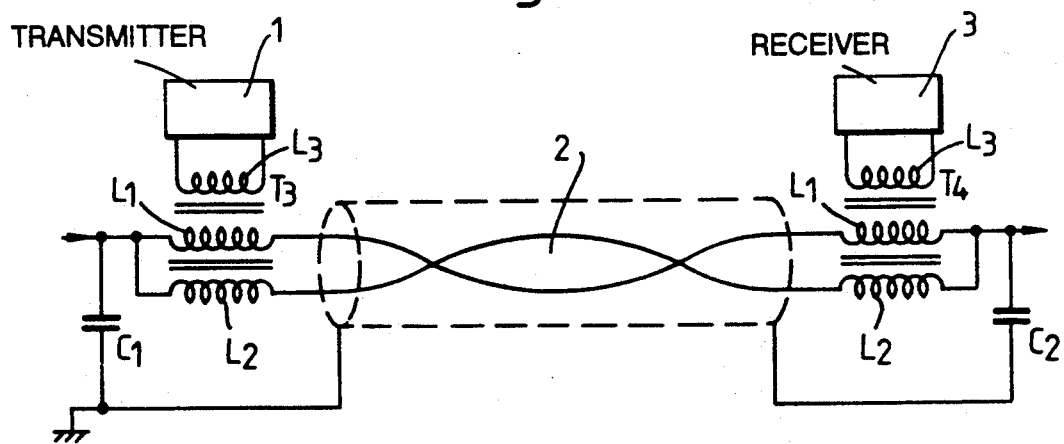
FIG. 2 is a circuit diagram of data transmission apparatus suitable for performing the method in accordance with the invention.

In FIG. 2 a power line is used to transmit digital data from a transmitter 1 to a receiver 3. The transmitter and receiver are conventional logic buffers.

A transformer $T_3$ couples data from the transmitter 1 onto the power line 2 and a second transformer $T_4$ detects the data and couples it into the receiver 3. The transformers $T_3$ and $T_4$ are connected in series with the power line and are of identical construction. A capacitor $C_1$, connected across the power line 2 shorts out any AC signal or ripple present before it can reach the transformer $T_3$. A second capacitor $C_2$ connected across the power line at a point beyond the transformer $T_4$ prevents the data from being transmitted any further. The power line 2, conveniently comprises a twisted pair and earthed screen.

Each transformer is wound on a single former, has a ferrite core, and has three coaxial windings in total $L_1$, $L_2$, $L_3$. Two of the windings $L_1$ and $L_2$ are bifilar windings and have the same number of turns. These two windings carry the power and because the current flow through one of them is arranged to be in the opposite sense to that in the other, the net DC magnetic flux through the transformer core will be zero. Hence the transformers can be made small and light without the need for an air gap. The third winding $L_3$ is connected to the transmitter 1 or receiver 3 as appropriate.

The transmitter 1 and receiver 3 may be replaced by a transceiver of a type which can be switched from a receive mode to a transmit mode. Thus bi-directional data communication is possible.

Data can be transmitted correctly and any electromagnetic fields generated by the data itself cancel, thus producing minimal external fields.

If the use of a screen as a power return is thought to be undesirable, then a third conducting line within the screen could be used for this purpose instead.

The embodiment of FIG. 2 may find applications in airborne systems which use, for example, the Military Standard 1553 data bus with line replaceable units requiring either AC or DC power. Other applications may be domestic, using the mains electricity supply for transmitting data to remote lighting or security locks, for example.

Figure 3:
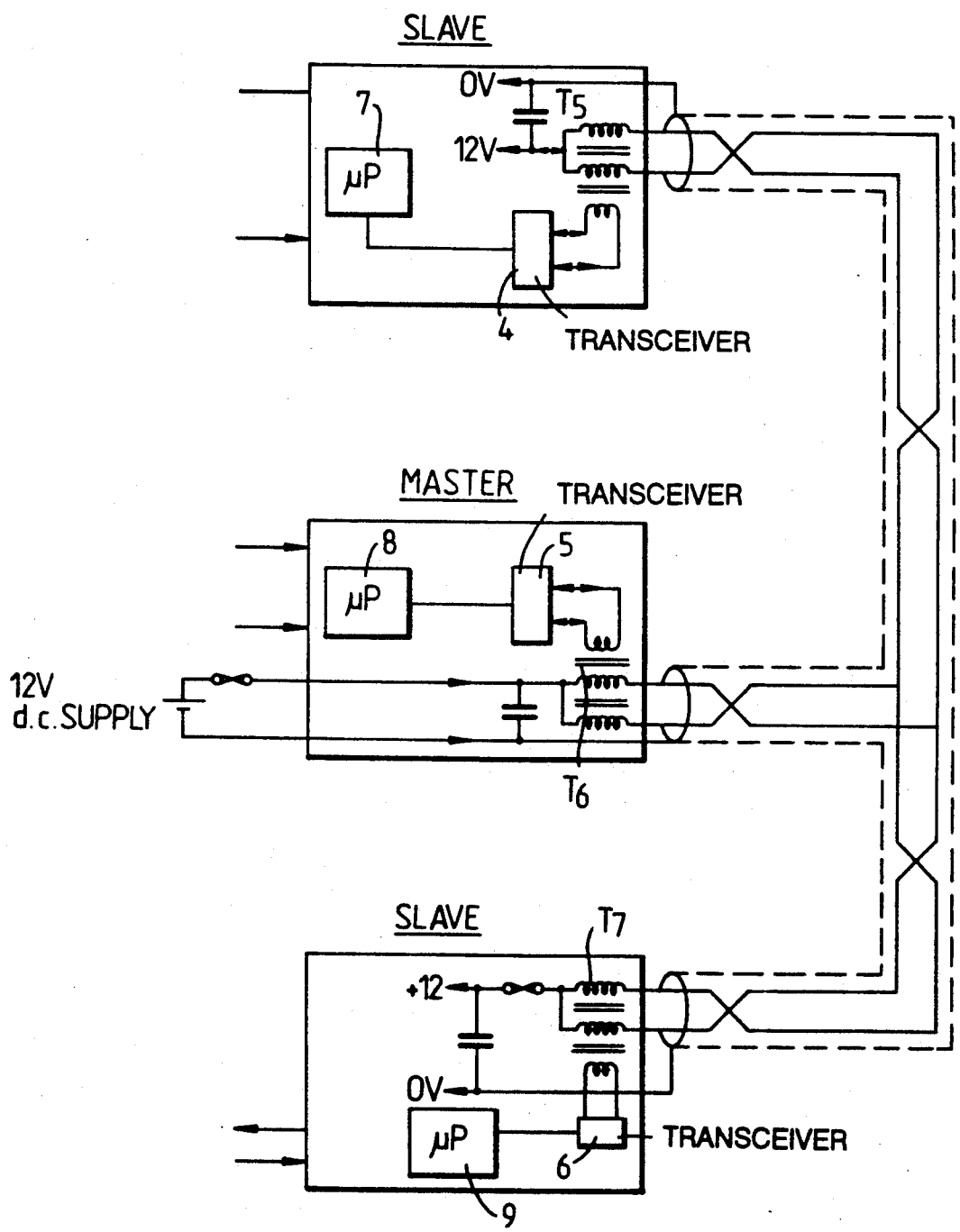
FIG. 3 is a circuit diagram illustrating a particular application of the invention.

Another application of the invention, and exemplified in FIG. 3 is the transmission of data around a motor vehicle, said data being transmitted on the 12 VDC supply line. In FIG. 3 data is transmitted and received by transceivers 4, 5 and 6 and transformers $T_5$, $T_6$ and $T_7$ by the same method as that disclosed with reference to FIG. 2. Again, the cable screen is used as a power return. The transceivers are controlled by microprocessors 7, 8, and 9 respectively and data signals could usefully be employed to control, for example, trafficators, windscreen wipers and dashboard instruments etc, thus reducing the complexity and weight of necessary wiring.

I claim:

1. Apparatus for transferring digital data from one location to a remote location using electrical power lines to said remote location, said power lines having a pair of lines and a grounded screen, said apparatus comprising:
   a transformer for connection to a source of electrical power; and
   a transceiver, for transmitting digital data to and for receiving digital data from said transformer, said transformer having first, second and third windings, said first and second windings being wound in opposition and each of said first and second windings are connected in series between said source of electrical power and a respective one of said pair of lines, whereby a net DC magnetic flux generated by a current flowing in one of the pair of lines and through said first winding is opposed by a current flowing in the other of said pair of lines and through said second winding and said third winding is coupled to said transceiver.

2. Apparatus according to claim 1 in which said first and second windings have an equal number of turns.

3. Apparatus according to claim 1 in which said transformer has a ferrite core.

4. A vehicular data transmission system for transmitting digital data from a source of electrical power through at least one master transceiver to at least one slave transceiver along a power line, said power line having a pair of lines and a grounded screen, said data transmission system permitting bidirectional communication between said master and slave transceivers, said master transceiver comprising:
   a master transformer for connection between said source of electric power and said power line, said master transformer having first, second and third master windings, said first and second master windings being wound in opposition and connected in series between said source of electrical power and a respective one of said pair of lines, whereby a net DC magnetic flux generated by a current flowing in one of the pair of lines and through said first master winding is opposed by a current flowing in the other of said pair of lines and through said second master winding; and
   a master transmitter/receiver, coupled to said third master winding, for transmitting digital data to and for receiving digital data from said master transformer: and
said at least one slave transceiver comprising:
   at least one slave transformer for connection in series with said power line, said at least one slave transformer having first, second and third slave windings, said first and second slave windings being wound in opposition and connected between a respective one of said pair of lines and a user of electrical power, whereby a net DC magnetic flux generated by a current flowing in one of the pair of lines and through said first slave winding is opposed by a current flowing in the other of said pair of lines and through said second slave winding; and
   at least one slave transmitter/receiver, coupled to said third slave winding, for transmitting digital data to and for receiving digital data from said at least one slave transformer.

5. Apparatus according to claim 4 in which said first and second master windings and said first and second slave windings have an equal number of turns.

6. Apparatus according to claim 4 in which said master transformer and said at least one slave transformer each has a ferrite core.

* * * * *